Patented Sept. 3, 1940

2,213,935

UNITED STATES PATENT OFFICE 2,213,935

CATALYTIC PROCESS FOR POLYMERIZING FATTY OILS

Samuel O. Sorensen and James C. Konen, Minneapolis, Minn., assignors to Archer-Daniels-Midland Company, a corporation of Delaware No Drawing. Application July 21, 1938, Serial No. 220,512

12 Claims. (Cl. 260—407)

This invention relates to a catalytic process for polymerizing oils and more particularly to the polymerization catalysts used therein.

Vegetable oils, such as linseed oil, are polymerized by heating to high temperatures either in an open kettle or under vacuum or pressure and with or without the presence of an inert gas. By these processes the oil is increased in viscosity to any desired point, even up to a solid or gelled condition. The polymerized products are called heat bodied oils and are valuable in the protective coating field for use in coating compositions, such as enamels, varnishes, printing inks, lacquers, etc.

There are many disadvantages to the heat bodying processes for oils used heretofore; chief among these being the relatively long time needed to obtain any substantial viscosity increase and the darkening in color which the oil undergoes in heating. There is a certain amount of decomposition occurring at the high temperatures used and this causes increase in the acid number, darkening in color, and excessive loss of oil. The bodying time can be shortened by increasing the temperature, but the acid number increase and color darkening are then accelerated, which is very objectionable.

Numerous proposals have been made for speeding up the oil bodying process by the use of catalysts. For example, it has been claimed that certain metal salts of the linoleates, resinates or naphthenates when dissolved in the oil have a polymerizing effect upon heating to high temperatures. Likewise, it has been stated that certain amine compounds, such as benzidine or diphenylamine, will also accelerate polymerization. However, these methods all cause excessive darkening in color of the oil, which usually makes them more objectionable than if no catalyst were used.

In accordance with the present invention we have discovered a method of accelerating the polymerization or heat bodying of oil that does not have the disadvantages mentioned above and will materially increase the bodying speed of the oil without damaging the color or causing excessive acid number increase. The process comprises the incorporation of relatively small amounts of certain aromatic compounds in the oil before or during the heat bodying treatment. We have discovered that a large number of the aromatic compounds or substances have a desired catalytic effect on polymerization or bodying of oils. In each case the most advantageous material to use depends upon several factors such as cost, effect on color, and acceleration of the polymerization of the oil. For some uses, such as in dark colored enamels or inks, the color retention is not so important as bodying speed. In certain light colored products color retention is of primary importance, although it is desirable to have the oil body as rapidly as possible.

Among the useful aromatic compounds we have found the polycyclic compounds containing condensed ring systems of at least three rings to be the most effective catalysts. There are a large number of such compounds which will accelerate the polymerization of the oils, some of these being anthracene, phenanthrene, anthraquinone, anthraquinone diacetate, beta hydroxy anthraquinone, alizarin, beta chloranthraquinone, phenanthraquinone, beta methyl anthraquinone and nitroanthraquinone. Apparently almost any derivative of anthraquinone having the anthraquinone nucleus has an accelerating effect but substances that include an acidic, inorganic residue appear to be disadvantageous in certain particulars and should be avoided.

Other aromatic polycyclic compounds which are effective as catalysts, are, naphthalene, alpha nitroso beta naphthol, oxyquinoline sulfate, 1,2-naphthoquinone and 1,4-naphthoquinone.

Summing the matter up, it may be stated that the substances which are available for use as catalysts in accordance with this invention fall into the general class of the aromatic polycyclic condensed nuclei compounds having at least two rings and not more than three rings which are substantially free of an acidic inorganic residue. A particular group in such class is made up of the polycyclic condensed nuclei quinone compounds, and of these we have had particularly good results with anthraquinone derivatives of the types given above.

The aromatic compound may be added to the oil in several ways, depending upon the effect desired. If the material is soluble in oil at room temperatures, it is simply dissolved in the oil which can then be polymerized at any time by the usual heat bodying methods. If the catalyst is not soluble except at high temperatures, it is added to the oil in the polymerizing vessel and dissolves as the oil is heated up to the bodying temperature. Some of the aromatic substances will dissolve in the oil when heated to about 150–250° F. and will then remain in solution when the oil is cooled down to room temperature. Examples of these are phenanthraquinone, beta methyl anthraquinone, phenanthrene, 1-4 naphthoquinone.

The amount of catalyst to be used also varies with the effect desired. In most cases we prefer to use not more than about 0.5% of catalyst and we find that some of the aromatic compounds show a definite accelerating effect on heat bodying when used in amounts of as little as 0.05%. However, we do not wish to confine our invention to either of these limits since they are not always essential. For example, addition of more than 0.5% of the aromatic catalyst will show an increased accelerating effect in many instances, and the reasons for using lesser amounts of catalyst are principally the cost of the material and a tendency to darken the color in some cases, particularly if nitrogen is present. In most cases it will be desirable to use not less than about 0.10% and not more than about 0.30% catalyst.

Illustrative but non-limiting examples of oils treated in accordance with the invention are given in the table below. In these tests varying amounts of anthraquinone were added to an alkali refined linseed oil and heated in a one-gallon laboratory kettle at 585° F.

| Oil No. | Percent anthraquinone catalyst | Cooking or polymerizing time (hours) | Viscosity (poises) |
|---|---|---|---|
| 1 | 0.0 | 4½ | 103 |
| 2 | 0.125 | 3⅝ | 157 |
| 3 | 0.25 | 3⅛ | 132 |
| 4 | 0.5 | 2½ | 106 |

Analyses of the above oils Nos. 1 and 4 show the following similarities of the polymerized oils:

| | Oil No. 1 | Oil No. 4 |
|---|---|---|
| Iodine number | 128.4 | 127.7 |
| Percent unsaponifiable | .87 | 1.16 |
| Acid number | 5.94 | 5.39 |
| Specific gravity | .9707 | .9696 |
| Refractive index | 1.4904 | 1.4900 |
| Molecular weight | 1640 | 1710 |

These two oils, Nos. 1 and 4, were tested for drying time after the addition of 0.2% Pb and 0.02% of Co driers. The oil No. 4 containing the anthraquinone catalyst dried in three hours and the oil No. 1, containing no catalyst dried in 3½ hours.

The percentage of unsaponifiable matter is slightly higher in oil No. 4 because of the addition of the catalyst.

In another example, 0.5% of anthraquinone catalyst was added to an alkali refined soybean oil and comparative heat bodying treatments were made with the same oil without using a catalyst. Both oils were bodied to approximately 100 poises at 585° F. under identical conditions. The oil containing the anthraquinone catalyst bodied in 6 hours whereas the same oil without the catalyst required 10¼ hours. The oil bodied with the catalyst was much lighter in color than the oil bodied without catalyst.

Although our invention is of particular value for use with linseed oil because of the wide use of that oil in the protective coating industry, the invention may be used equally well with various other fatty oils including drying and semi-drying oils, such as for example, Perilla, hempseed, soybean, sunflower, oils. The use of the aromatic catalyst is particularly valuable with the slower bodying oils which normally darken badly before reaching the desired viscosity because of the long cooking time. Here the advantage in speed and color retention by using our invention make the use of slower bodying oils feasible in places where they heretofore could not be used.

The broad class of catalysts that we have found to be particularly useful in this invention comprises the aromatic multiple ring compounds having ten to about twenty-one carbon atoms and being characterized by the capability of bodying various oils when added thereto in relatively small amounts as described above.

Various modifications and changes may be made in the materials, compositions and method of procedure described hereinabove without departing from the scope of our invention, some of the novel features of which are defined in the appended claims.

We claim:

1. In a process for heat bodying oils of the class of drying and semi-drying oils, the improvement which comprises using as a catalyst anthraquinone in sufficient proportion to have a substantial catalytic effect upon the bodying of the oil during heating.

2. In a process for heat bodying fatty oils, the improvement which comprises using as a catalyst an anthraquinone derivative having the anthraquinone nucleus but which is substantially free of an acidic inorganic residue in sufficient proportion to have a substantial catalytic effect upon the bodying of the oil during heating.

3. In a process for heat bodying fatty oils, the improvement which comprises using as a catalyst approximately 0.05% to 0.5% of beta-methyl anthraquinone in sufficient proportion to have a substantial catalytic effect upon the bodying of the oil during heating.

4. In a process for heat bodying oils of the class of drying and semi-drying oils, the improvement which comprises using as a catalyst approximately 0.05% to 0.5% of beta chloranthraquinone in sufficient proportion to have a substantial catalytic effect upon the bodying of the oil during heating.

5. An oil of the class of drying and semi-drying oils adapted to be bodied by heat and containing as bodying catalyst approximately 0.05% to 0.5% of anthraquinone in sufficient proportion to have a substantial catalytic effect upon the bodying of the oil during heating.

6. In a process for heat bodying oils of the class of drying and semi-drying oils, the improvement which comprises using in sufficient proportion to have a substantial catalytic effect upon the bodying of the oil during heating, an aromatic compound selected from the group consisting of naphthalene, alpha nitroso beta naphthol, oxyquinoline sulfate, 1,2-naphthoquinone and 1,4-naphthoquinone, anthracene, phenanthrene, anthraquinone, anthraquinone diacetate, beta hydroxy anthraquinone, alizarin, beta chloranthraquinone, phenanthraquinone, beta methyl anthraquinone and nitroanthraquinone.

7. In a fatty oil adapted to be bodied by heat a catalyst comprising an aromatic, polycyclic, condensed nucleic compound having at least two rings and not more than three rings and being substantially free of an acidic inorganic residue, said compound being present in sufficient proportion to have a substantial catalytic effect upon the bodying of the oil during heating.

8. A fatty oil-catalyst substance as defined in claim 7 in which the oil is of the class of drying and semi-drying oils.

9. A fatty oil-catalyst substance as defined in claim 7 in which the catalyst is present in an amount of about 0.05% to 0.5% of the weight of the oil.

10. A fatty oil-catalyst substance as defined in claim 7 in which the catalyst compound has between 10 and 15 carbon atoms.

11. A fatty oil adapted to be bodied by heat and containing as a bodying catalyst an aromatic, polycyclic, condensed nuclei quinone compound which is substantially free of an acidic inorganic residue, said compound being present in sufficient proportion to have a substantial catalytic effect upon the bodying of the oil during heating.

12. A fatty oil adapted to be bodied by heat and containing as a bodying catalyst about 0.05% to 0.5% by weight of a non-electrolyte, aromatic polycyclic condensed nuclei compound having a quinone grouping which is substantially free of an acidic inorganic residue.

SAMUEL O. SORENSEN.
JAMES C. KONEN.